US005171599A

United States Patent [19]

Weber

[11] Patent Number: 5,171,599

[45] Date of Patent: Dec. 15, 1992

[54] LOW WATER ACTIVITY REFRIGERATED COOKIE DOUGH

[75] Inventor: Jean L. Weber, Minneapolis, Minn.

[73] Assignee: The Pillsbury Company, Minneapolis, Minn.

[21] Appl. No.: 744,591

[22] Filed: Aug. 13, 1991

Related U.S. Application Data

[63] Continuation-in-part of Ser. No. 743,044, Aug. 8, 1991.

[51] Int. Cl.[5] ............ A21D 2/18

[52] U.S. Cl. ............ 426/549; 426/496; 426/653; 426/658; 426/660

[58] Field of Search ............ 426/262, 540, 94, 549, 426/275, 553, 502, 496, 653, 556, 660

[56] References Cited

U.S. PATENT DOCUMENTS

| | | | |
|---|---|---|---|
| 4,112,125 | 9/1978 | Chesnut et al. | 426/250 |
| 4,167,422 | 9/1979 | Bellanca et al. | 106/289 |
| 4,315,035 | 2/1982 | Basa et al. | 426/250 |
| 4,372,982 | 2/1983 | Haasl et al. | 426/549 |
| 4,455,333 | 6/1984 | Hong et al. | 426/94 |
| 4,503,080 | 3/1985 | Brabbs et al. | 426/94 |
| 4,582,711 | 4/1986 | Durst | 426/128 |
| 4,732,767 | 3/1988 | Seiden et al. | 426/94 |
| 4,738,859 | 4/1988 | Kenneally | 426/94 |
| 4,759,936 | 7/1988 | Best et al. | 426/250 |
| 4,803,084 | 2/1989 | Shine | 426/549 |
| 4,904,493 | 2/1990 | Petrizzelli | 426/549 |
| 4,988,841 | 1/1991 | Pesheck et al. | 219/10.55 |

*Primary Examiner*—R. B. Penland
*Attorney, Agent, or Firm*—Kinney & Lange

[57] ABSTRACT

A refrigerated cookie dough composition is disclosed which has low water activity and also includes edible bits containing coloring agents such as Brach's ® candy coated chocolates to form a product which is substantially free of color bleed after 90 days of refrigerated storage. The dough composition of the present invention has a water activity no greater than about 0.75. A method of forming a refrigerated dough composition having a water activity of no greater than 0.75 is also disclosed.

15 Claims, 1 Drawing Sheet

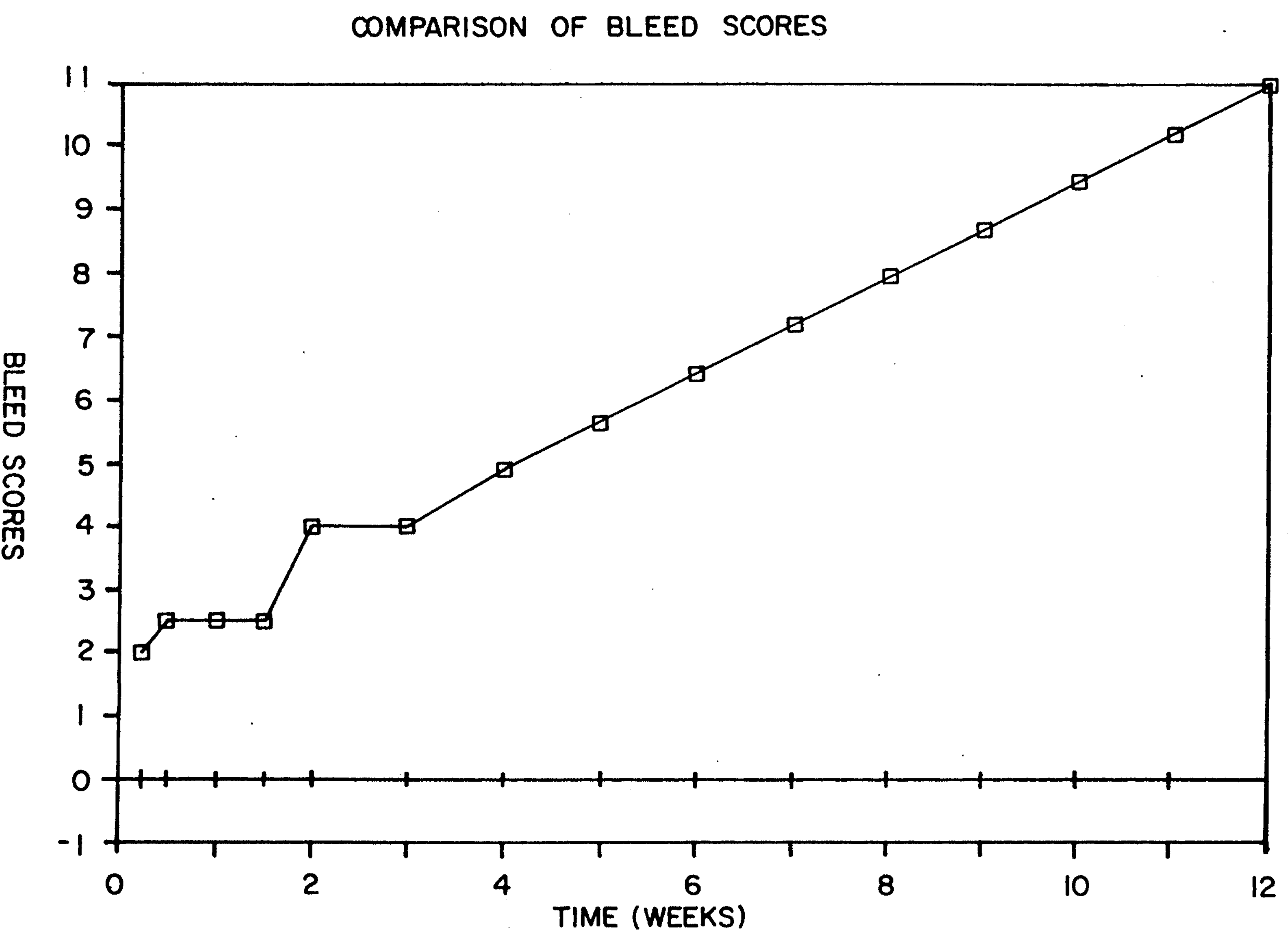
COMPARISON OF BLEED SCORES
BLEED SCORES
11
10
9
8
7
6
5
4
3
2
1
0
-1
0
2
4
6
8
10
12
TIME (WEEKS)

LOW WATER ACTIVITY REFRIGERATED COOKIE DOUGH

BACKGROUND OF THE INVENTION

This application is a continuation-in-part of application Ser. No. 07/743,044, filed on Aug. 8, 1991.

This invention relates broadly to refrigerated doughs, and methods of making the same. In particular, it relates to a novel shelf-stable refrigerated cookie dough composition having low water activity containing color agent-containing edible food particles.

Although many shelf-stable commercially manufactured cookies are available to the public, many consumers prefer the aroma and flavor of freshly baked cookies. Baking cookies requires selecting a recipe, assembling the ingredients, measuring the ingredients, mixing the ingredients in the manner specified in the recipe, placing the dough in a baking utensil and baking the dough to form cookies. Baking cookies is very time consuming, and can be difficult. The food industry has developed many ready-to-bake products which eliminate the time consuming steps of measuring and mixing ingredients. One class of products which are currently available to the public are ready-to-bake refrigerated cookie doughs which can be removed from the packaging, cut into pieces, and baked.

Refrigerated cookie doughs must not only form appetizing cookies upon baking, but must not degrade in quality while the dough is in refrigerated storage. At the present time, the known shelf-stable refrigerated doughs do not contain color agent-containing edible particles. Refrigerated cookie doughs containing chocolate chips and raisins are known, however.

Several cookie dough compositions are known which can be combined with edible particles and then immediately baked to form a baked cookie. An example of one such dough composition is described in Kenneally U.S. Pat. No. 4,738,859. Kenneally describes a process of preparing cookies with a prominent display of edible bits, or particles. The process includes forming a dough rope from a suitable cookie dough composition, creating a channel on its top surface, placing edible bits in the channel, covering the bits with a partial layer of additional dough in the form of randomly placed strings or strips, cutting the rope into individual cookie shapes, and baking the shapes. It is reported that the $A_w$ values of normal cookie systems, after baking are between about 0.25 and 0.8.

One dough composition disclosed in Example 1 of Kenneally (inner dough) includes 9% sucrose, 13.74% shortening and emulsifiers, 1.15% water, 22.1% corn syrup, 21.41% flour, 0.4% soda, 0.5% salt, 0.2% albumin, 2,5% starch and 29.0% candy. Another dough composition disclosed in Example (outer dough) includes 35.2% sucrose, 19.4% shortening and emulsifiers, 9.5% water, 1,5% molasses, 31.55% corn syrup, 0.5% soda, 0.7% salt, 0.1% egg yolk solids, 0.25% albumin and 1.3% starch.

The Kenneally patent refers to U.S. Pat. No. 4,455,333 to Hong et al. as describing a cookie dough formulation which forms a chewy cookie, and another formulation which forms a crispy cookie. The author, in describing the doughs states that "[o]ne, both, or either dough can further comprise a member selected from the group consisting of cereals, nutmeats, peanut butter, cocoa, raisins, chocolate chips, butterscotch chips and mixtures thereof. It has now been found that in addition to the above list, fruit pieces, candies and confections such as M & M's ® Reese's Pieces ®, and Rolos ®, and chocolate or fudge chunks are also suitable ingredients." Kenneally U.S. Pat. No. 4,738,859, col. 3, lines 1-8.

Hong et al. U.S. Pat. No. 4,455,333, one of the patents incorporated by reference into Kenneally, discloses storage stable baked cookies having texture variability. "Storage stable" is defined in that patent as retaining a plurality of textures after baking and reaching equilibrium. Col. 4, lines 21-23.

Another patent incorporated by reference into Kenneally U.S. Pat. Nos. 4,738,859 is Brabbs et al. 4,503,080. Brabbs et al. also disclose a cookie product having discrete crispy texture regions and discrete chewy texture regions which maintain the different consistencies during storage of the baked good. The textural properties are maintained by providing a material capable of inhibiting crystallization of the sugar during storage. It was reported that the final water activity of the cooked goods such as cookies should be between about 0.25 and about 0.8.

Although Kenneally reports that the dough compositions described in U.S. Pat. No. 4,455,333 to Hong et al. are suitable for combining with edible particles such as nutmeats, hard candy and candy coated chocolates, for example immediately prior to baking, such dough compositions are not reported to be resistant to color bleed when stored under refrigerated conditions for days, weeks, or months prior to cooking.

In particular, the coloring in hard candy and in the coating of candy coated chocolates bleeds into cookie doughs during storage, causing a reduction in the quality of the product which is unacceptable to consumers. Also, some particles absorb moisture in the dough which can reduce the quality of the edible particles. An example would be discoloration of a candy due to exposure to moisture. In the case of nutmeats, moisture causes the nuts to soften and lose their desirable organoleptic properties. If after combining a conventional cookie dough composition with color agent-containing edible bits such as M & M's ® for example, the dough is not baked immediately, the color bleeds into the dough and is unacceptable to the consumer.

Colored candies such as M & M's ®, Reese's Pieces ®, Brach's ® candy coated chocolates and hard candies, for example, which are suitable for addition to cookie dough include several color agents which are known to bleed into surrounding dough upon exposure to moisture. This phenomena is referred to in the art as "color bleed." Among the agents responsible for color bleed are: water soluble dye pigments and color lakes. Color lakes are generally less soluble in water as compared to dye pigments. Bellanca et al. U.S. Pat. No. 4,167,422 discloses organic dye pigment lakes which are representative of color lakes used to color foods. Dye pigments as well as color lakes are known to dissolve in the water in the dough, and cause color bleed to occur during refrigerated storage.

The problem of preventing pigment migration from added edible particles in dough during the baking process is not new. Seiden et al. U.S. Pat. No. 4,732,767 describes a method of reducing chip bleed in flavor-chip containing baked goods which includes adding to the dough a selected emulsifier which is predominantly crystalline at room temperature to form a stable dough emulsion. The emulsifier ties up the oil and syrup phases of the dough in a stable emulsion, so that the oil and syrup phases are less available to solubilize the chip components. Seiden, Col. 3, lines 27–29.

The significance of free water content in food compositions has been recognized for some purposes. For example, it is known to control the free water content of simulated fruit and vegetable particles to prevent spoilage as disclosed in Chesnut et al. U.S. Pat. No. 4,112,125. That patent describes semi-moist, semi-soft, shelf-stable and non-bleeding particles for carrying a food flavor. The particles are suitable for adding to food compositions such as dry muffin and dry cake mixes. The particles are formed from a gelatinized starch having the ability to absorb colors and flavors and substantially reduce the migration of colors and flavors in the simulated food particle. The particles also include as a component a dairy or vegetable protein to achieve long term semi-soft texture. The composition uses a vegetable fat to replace "otherwise necessary" water to retain the semi-moist character, and reduce water activity to eliminate bacterial and fungal growth. Chesnut et al., col. 3, lines 38–44. The shelf-stable particles have a water activity no greater than 0.85.

Pesheck et al. U.S. Pat. No. 4,988,841 discusses binding the water in a sauce composition for the purpose of preventing moisture migration of the water in the sauce during storage. The composition of the sauce and the $A_w$ value are not reported.

Durst U.S. Pat. No. 4,852,711 discloses a variety of baked goods having a water activity $A_w$ at or below 0.85. The patent describes the desirability of controlling the $A_w$ value of batter or dough to less than 0.93 and most preferably less than 0.80 for the purpose of improving the shelf life of the cooked good. Durst, Col. 4, lines 41–44.

SUMMARY OF THE INVENTION

The present invention is a refrigerated dough composition including a cookie dough having an $A_w$ value at or below 0.75 and color agent-containing edible food particles. The refrigerated dough composition is substantially free of color bleed for about 90 days at about 45 degrees Fahrenheit. The food particles are of a type which when combined with conventional refrigerated dough compositions having $A_w$ values of about 0.8 or above dissolve into the dough, either degrading the quality of the particle, or degrading the quality of the surrounding dough, or both. The refrigerated dough composition of the present invention includes about 20–50% by weight flour, about 20–40% by weight total sugar, about 12–25% by weight shortening, about 0–10% by weight added water, and minor amounts of leaveners, salt, egg albumin, egg yolk solids and enrichment. A method of forming a dough composition suitable for combining with color agent-containing edible particles and which is resistant to color bleed under refrigerated storage conditions is also disclosed.

BRIEF DESCRIPTION OF THE DRAWINGS

The FIGURE is a graph of Color Bleed v. Storage Time for a conventional cookie dough combined with candy coated chocolates, and for a dough composition of the present invention combined with candy coated chocolates at 45 degrees Fahrenheit.

DETAILED DESCRIPTION OF THE PREFERRED EMBODIMENTS

A refrigerated cookie dough composition containing color agent-containing edible particles which is substantially free of color bleed for about 90 days under refrigerated storage conditions is disclosed. Dough compositions of the present invention have a free water value of no greater than 0.75. The composition is suitable for combining with a wide variety of color agent-containing edible particles such as hard candies like "Fun Fetti®", candy coated chocolates such as "Hershey-ets®", Brach's® Candy Coated Chocolates and "M & M's®", chocolate morsels, "Heath®" brand toffee, colored sugar crystals, colored white chocolate morsels and the like. "Color agents" for purposes of this disclosure are compounds which impart color to food. Examples include dye pigments and color lakes. Each of the above-mentioned edible particles contain at least one color agent. The color agents have some tendency to bleed color into the surrounding dough when combined with conventional cookie doughs and when stored under refrigerated conditions prior to cooking. What is meant by "refrigerated storage" is storage at temperatures between about 40 and about 50 degrees Fahrenheit with a typical storage temperature of about 45 degrees Fahrenheit.

Some edible particles such as chocolate morsels and hard candies, for example, have a tendency to absorb moisture during storage, losing desirable organoleptic properties. In particular, the outer surfaces of chocolate morsels absorb moisture and become white and chalky in appearance. The resulting mouth feel and flavor is undesirable to consumers.

When the edible particles are candy coated confections such as Reese's Pieces®, Brach's® candy coated chocolates and Hershey-ets®, for example, the color agents contained in the outer coating layer are known to bleed into the dough, causing color streaking. This streaking is referred to in the trade as "color bleed" and is highly undesirable to consumers. When candy coated or colored fondants such as hard candy particles are combined with conventional refrigerated dough compositions having $A_w$ values above about 0.75, color bleed becomes pronounced in as little as one day after the commencement of refrigerated storage.

A representative conventional dough composition having an $A_w$ value above about 0.75 is provided below:

| Conventional Dough Composition | |
|---|---|
| Ingredient | Weight Percent |
| sugar | 24.319 |
| flour | 28.389 |
| soda | 0.490 |
| salt | 0.490 |
| egg yolk solids | 0.786 |
| albumen | 0.890 |
| enrichment | 0.004 |
| shortening | 13.879 |
| oil | 1.542 |
| water | 10.302 |
| molasses | 2.140 |
| vanilla | 0.103 |
| candy pieces | 16.666 |
| | 100.000 |

The ratio of sucrose to other sugar in this formulation is: 35.5:1. This ratio assumes that molasses is 35 percent by weight sucrose and 33 percent by weight other sugar. The water activity of the above conventional dough formulation is about 0.8 $A_w$, as measured by means known to persons skilled in the art.

"Water activity", hereinafter referred to as $A_w$, for purposes of this disclosure is the ratio of the fugacity of the dough composition being measured over the fugacity of pure water. An $A_w$ value of 1 would indicate that the composition has 100% free water.

"Sugar" for purposes of this disclosure includes sweet tasting monosaccharides and disaccharides of highly refined to unrefined forms, including maple syrup, corn syrup, brown sugar, molasses and granulated sucrose. Examples of sugars of the present invention include sucrose, glycerol, fructose, maltose, glycerine, arabinose and sorbitol.

It was surprisingly discovered that by lowering the $A_w$ value of the dough composition to 0.75 or below, that color agent-containing edible particles can be combined with doughs of the present invention and stored under refrigerated conditions for at least 90 days without significant color bleed in the dough.

The composition of the present invention includes 20–50% flour, 20–40% total sugar, 12–25% shortening, 0–10% added water, minor amounts of leaveners, salt, egg albumin, egg yolk solids and enrichment.

It was surprisingly discovered that by lowering the water activity of a refrigerated dough composition to no greater than 0.75, that the interaction between the dough and the color agents in edible particles is kept to a minimum, preventing color bleed in colored candies and candy coated flavor bits. Refrigerated doughs of the present invention also advantageously preserve the quality of other types of edible particles which are moisture sensitive such as Heath ® bits, nutmeats and chocolate bits, for example.

A preferred method of lowering the $A_w$ value of the dough composition is to combine substantially all of the water to be added to the dough with an agent capable of saturating the water. Adding an amount of an agent sufficient to substantially saturate the water is believed to aid in lowering the $A_w$ value of the dough. Saturating the water is believed to chemically bind the water molecules. Although the mechanism of "binding" the water molecules in the dough system of the preferred embodiment is not precisely understood, it is believed that hydrogen bonding between the water molecules and the agent prevents the water molecules from later interacting with the color agents contained in the edible particles in the refrigerated dough composition.

A preferred method of binding the water molecules includes adding enough sucrose to completely saturate the water at a temperature of about 40 degrees Fahrenheit prior to addition of the dry ingredients. In a preferred dough composition, the weight ratio of sugar to water required for saturation at the stated temperature of 40 degrees Fahrenheit is about 1.835:1. A preferred dough composition formed according to a preferred method of the present invention includes sucrose as a preferred agent for binding the water to be added into the dough composition.

According to a preferred method, prior to forming the saturated sucrose solution, the majority of the sucrose used in the dough composition is added to a mixer at a temperature of between about 40 and about 50 degrees Fahrenheit. It is to be understood that all but an amount of sucrose needed to saturate the water is added to the mixer. Next, a shortening slurry is made by combining a quantity of liquid oil and a quantity of solid shortening, both collectively referred to as "shortening" at a temperature of about 89 degrees Fahrenheit and adding the shortening slurry to the mixer. The shortening slurry is mixed with the sucrose.

"Shortening" for purposes of this disclosure includes unsaturated oils such as vegetable oil, olive oil, safflower oil, coconut oil, palm oil and sunflower oil, for example which are a liquid at room temperature, and also saturated oils such as butter, lard, animal fat and solid vegetable fats which are substantially solid at room temperature.

Next, a sugar slurry is formed by combining the saturated water with at least one additional sugar other than sucrose such as molasses. To the mixture flavoring is added. After blending the flavoring into the liquid solution, an additional sugar such as corn syrup is added and the mixture is blended again, forming a sugar slurry of the present invention. According to the preferred method, a ratio of sucrose to other sugar is maintained on the final composition between about 0.85:1 and about 5.13:1. Maintaining this ratio is believed to lower the $A_w$ value of the resulting dough composition to 0.75 or below. Although not precisely understood, it is believed that this $A_w$ value is responsible for preventing color bleed in the dough during refrigerated storage.

It was surprisingly discovered that saturating the water with sucrose in itself is insufficient to lower the $A_w$ value of the dough below 0.8. In a preferred embodiment, a combination of two or more sugars of differing molecular chain lengths are present in the sugar slurry in order to form a refrigerated dough formulation which has an $A_w$ value at or below 0.75.

A study was conducted to compare the color bleed characteristics of a composition of the present invention with the shelf life of a "conventional" dough composition as shown, above. A preferred dough formulation was made, and a quantity of Brach's ® candy coated chocolate bits were added in an amount equal to about 16.67% of the weight of the composition. Similarly, the conventional dough was made, and the same quantity of identical edible bits was added. The experiment was designed to compare "color bleed" in doughs of the present invention with "color bleed" of conventional doughs having $A_w$ values above 0.75.

Although the measurement of "color bleed" can be considered somewhat subjective, a comparative rating system was developed which identifies those compositions which produce results which are unacceptable to the consumer. A rating scale of 0–5 was developed which assigns a value of zero to a cookie which demonstrates no color loss to the dough over time, while a value of 5 indicates that all color is lost to the dough and white candy pieces remain. A value of 1 indicates a small amount of visible bleed including a transfer of a small amount of color to the dough. A value of "2" indicates that obvious color is visible in the dough. A value of "3" indicates that intense coloring around the candy pieces is present. A value of "4" indicates that white spots are visible on the candy and that intense color is present in the dough.

The FIGURE presents a comparison between color bleed in a conventional dough as compared to color bleed characteristics of doughs of the present invention. The X axis represents time (in units of weeks) of storage and the Y axis represents the degree of color bleed.

As shown in the FIGURE, a conventional dough formulation combined with Brach's ® candy coated chocolate pieces exhibit unacceptable color bleed within about a day. This dough formulation has an $A_w$ value of 0.80. Any reported bleed values exceeding one are considered unacceptable to the consumer. For purposes of this disclosure, the phrase "substantially free of color bleed" includes doughs which demonstrate a maximum color bleed value according to the above-described method of 1.

In contrast, a preferred dough composition of the present invention having an $A_w$ value of 0.75 or below showed substantially no color bleed after 84 days of storage. Although the data is not shown on the graph, color bleed values of about 0 were also observed after 90 days of refrigerated storage.

In a preferred embodiment, the dough composition of the present invention used in this comparative study has an $A_w$ value of 0.719. A combination of molasses, corn syrup, flavoring and sucrose-saturated water are included in a water slurry of the present invention which when combined with granular sugar, flour, leaveners, egg solids, salt, shortening, and enrichment forms a dough composition which has an $A_w$ value of 0.75 or below.

The preferred composition used in this experiment is set forth by way of example below:

EXAMPLE 1

Dough Composition

| Ingredient | Weight Percent |
|---|---|
| sucrose | 11.496 |
| SHORTENING SLURRY | 13.879 |
| shortening | |
| soybean oil | 1.542 |
| WATER SLURY | 3.214 |
| water | |
| sucrose | 6.179 |
| molasses | 1.783 |
| vanilla | 0.086 |
| corn syrup | 12.854 |
| flour | 30.528 |
| soda | 0.392 |
| salt | 0.408 |
| egg yolk solids | 0.411 |
| albumin | 0.558 |
| enrichment | 0.004 |
| candy pieces | 16.666 |
| | 100.000 |

The above ingredients were combined by first adding sugar (minus the sucrose in the water slurry) to a mixer at 40 to 50 degrees Fahrenheit. Next, shortening and soybean oil were heated to about 89 degrees Fahrenheit and premixed to form a shortening slurry. The shortening slurry was pumped into the mixer, and mixed with the sugar to form a shortening/sugar slurry.

A sugar slurry was next made separately by heating the water to be added to about 90 degrees Fahrenheit and adding sucrose in a sugar to water ratio of about 1.83:1 by weight to form a saturated sugar and water solution. What is meant by "saturated" for purposes of this disclosure is the maximum amount of sugar that can be dissolved in the water at about 40 degrees Fahrenheit.

The solution was cooled to about 40 degrees Fahrenheit. A small amount of crystal formation in the solution was present which indicated that the solution was substantially completely saturated with sucrose. Liquid molasses at 70 degrees Fahrenheit was added to the cooled saturated solution and the resulting composition was mixed. Next, vanilla which was at 70 degrees Fahrenheit was added and the composition was mixed. The stated amount of corn syrup which was also at 70 degrees Fahrenheit was then added and the slurry was mixed again, forming a sugar slurry of the present invention.

The dry ingredients were premixed, and then the dry premix was added to the mixer and mixed with the other ingredients for about 45 seconds at high speed. The particular candy pieces used were Brach's ® candy coated chocolates. The candies were added last, and the dough was again mixed.

It was surprisingly discovered that by maintaining a sucrose to other sugar ratio of the dough composition between about 0.85:1 and about 5.13:1, that it is possible to reduce the $A_w$ value of the dough to 0.75 or below. Such $A_w$ values produce a dough composition which can be combined with color agent-containing edible particles and stored at 45 degrees Fahrenheit for at least 90 days without noticeable color bleed into the dough or discoloration of the candy particles.

It was further discovered that the total sugar content in compositions of the present invention must include more than one type of sugar. In a preferred embodiment, sucrose, corn syrup (containing about 30% fructose and about 41% dextrose) and molasses (containing about 35% sucrose, 16.5% fructose and about 16.5% dextrose) in combination lowered the $A_w$ value of the dough to 0.75 or below. Although not precisely understood, it is believed that sucrose alone is only capable of lowering the $A_w$ value to 0.8. Other chain length sugar molecules are necessary to bring the $A_w$ value down to 0.75 or below.

A low $A_w$ dough of the present invention was combined with other edible particles such as Heath ® bits, walnuts, hard candies and colored white chocolate chips to determine if the refrigerated products had favorable shelf-life characteristics.

The dough compositions were made and mixed with the respective edible bits and stored at 45 degrees Fahrenheit for a period of six to eight weeks.

The Heath ® bits maintain their integrity over time but did lose some hardness with age. Although this application of the dough composition of the present invention was less successful than with color agent-containing edible bits, the dough composition of the present invention performed much better than the did conventional dough composition.

The dough compositions containing 8% walnuts by weight maintained their initial crispness. However, some deterioration in organoleptic properties did occur with time during storage. The shelf-life performance of the walnut-containing composition of the present invention outperformed the walnut and conventional dough formulation.

The hard candy and colored white chocolate chip compositions of the present invention showed no noticeable bleed or loss of particle shape during the ninety day period of refrigerated storage at 45 degrees Fahrenheit.

Although a preferred water slurry of the present invention employs the use of a mixture of sugars to lower the $A_w$ value of the dough composition, the present invention contemplates the use of any agent capable of lowering the $A_w$ value in the refrigerated cookie dough composition. One limitation on the use of compositions capable of lowering the $A_w$ value is that the agent for lowering the $A_w$ value should not adversely affect the textural and flavor characteristics of the dough. The present invention contemplates the use of a wide variety of agents such as sugars, salts, mixtures thereof and other compositions in which hydrogen bonding with the water molecules takes place, and which does not adversely affect the organoleptic properties of the cooked product.

Dough compositions of the present invention advantageously prevent undesirable phenomena such as color bleed and a reduction in the organoleptic properties of edible particles during refrigerated storage. Although the industry demands only that refrigerated dough products exhibit acceptable shelf-life characteristics for about 90 days under refrigerated storage conditions, it was surprisingly discovered that dough compositions of the present invention when combined with color agent-containing edible particles displayed acceptable resistance to color bleed for a minimum of 120 days. What is meant by "acceptable shelf life characteristics" is a product which is of an acceptable quality to consumers for consumption after refrigerated storage.

In addition to a preferred formulation disclosed in Example 1, the following seven compositions of the present invention were formulated to better illustrate the scope of the present invention. In each of the examples below, the shortening is 90% by weight solid shortening, and 10% by weight liquid shortening at room temperature.

EXAMPLE 2

A dough composition having 24.66% sucrose, 15.213% shortening, 5% water, 0.11% vanilla, 0.96% molasses, 3.56% corn syrup, 3.56% glycerine, 30.0% flour, 0.30% soda, 0.51% salt, 0.41% egg yolk solids, 0.56% albumin, 0.004% enrichment and 16.67% of Brach's candy coated chocolate bits, all measured by weight were combined according to the method outlined above. The sucrose to other sugar ratio of the composition was 5.13:1 and the $A_w$ value was 0.727.

EXAMPLE 3

A dough composition having 15.1% sucrose, 19.29% shortening, 0% water, 0.11% vanilla, 1.78% molasses, 13.42% corn syrup, 0% glycerine, 31.85% flour, 0.39% soda, 0.41% salt, 0.41% egg yolk solids, 0.56% albumin, 0.004% enrichment and 16.67% of Brach's candy coated chocolate bits, all measured by weight were combined according to the method outlined above. The sucrose to other sugar ratio of the composition was 1.56:1 and the $A_w$ value was 0.737.

EXAMPLE 4

A dough composition having 15.76% sucrose, 16.64% shortening, 0% water, 0.11% vanilla, 1.78% molasses, 14.01% corn syrup, 0% glycerine, 33.25% flour, 0.39% soda, 0.41% salt, 0.41% egg yolk solids, 0.56% albumin, 0.004% enrichment and 16.67% of Brach's candy coated chocolate bits, all measured by weight were combined according to the method outlined above. The sucrose to other sugar ratio of the composition was 1.55:1 and the $A_w$ value was 0.712.

EXAMPLE 5

A dough composition having 17.53% sucrose, 15.14% shortening, 0% water, 0.11% vanilla, 1.78% molasses, 16.73% corn syrup, 0% glycerine, 30.25% flour, 0.39% soda, 0.41% salt, 0.41% egg yolk solids, 0.56% albumin, 0.004% enrichment and 16.67% of Brach's candy coated chocolate bits, all measured by weight were combined according to the method outlined above. The sucrose to other sugar ratio of the composition was 1.46:1 and the $A_w$ value was 0.681.

EXAMPLE 6

A dough composition having 16.86% sucrose, 17.62% shortening, 0% water, 0.11% vanilla, 1.78% molasses, 16.09% corn syrup, 0% glycerine, 29.09% flour, 0.39% soda, 0.41% salt, 0.41% egg yolk solids, 0.56% albumin, 0.004% enrichment and 16.67% of Brach's candy coated chocolate bits, all measured by weight were combined according to the method outlined above. The sucrose to other sugar ratio of the composition was 1.46:1 and the $A_w$ value was 0.668.

EXAMPLE 7

A dough composition having 11.03% sucrose, 17.01% shortening, 0% water, 0.11% vanilla, 2.36% molasses, 18.54% corn syrup, 0% glycerine, 32.22% flour, 0.54% soda, 0.54% salt, 0.41% egg yolk solids, 0.56% albumin, 0.004% enrichment and 16.67% of Brach's candy coated chocolate bits, all measured by weight were combined according to the method outlined above. The sucrose to other sugar ratio of the composition was 0.85:1 and the $A_w$ value was 0.671.

EXAMPLE 8

A dough composition having 20.23% sucrose, 16.58% shortening, 5% water, 0.11% vanilla, 2.04% molasses, 6.5% corn syrup, 2% glycerine, 29.09% flour, 0.40% soda, 0.41% salt, 0.41% egg yolk solids, 0.56% albumin, 0.004% enrichment and 16.67% of Brach's candy coated chocolate bits, all measured by weight were combined according to the method outlined above. The sugar to water ratio of the composition was 1.77:1.

In each of the above examples, the $A_w$ value is no greater than 0.75 which indicates that each of the resulting dough formulations are resistant to color bleed and form suitable cookie doughs that can be combined with color agent-containing edible particles and stored under refrigerated conditions for at least 90 days without significant color bleed.

Each of the sucrose/other sugar ratios calculated for Examples 1-8 assumes that: molasses is: 24% by weight water, 35% sucrose, and 33% fructose and dextrose combined; that glycerine is 30% by weight water and 70% by weight glycerol; that corn syrup is 29% by weight water, 42% fructose and 29% dextrose; and that the water content in the flour contributes a negligible amount to the $A_w$ value of the compounds of the present invention and is therefore not accounted for in computing the ratios. It also assumed that brown sugar contains 97% sucrose, about 2% water and about 1% ash.

The above examples illustrate that compositions having a sucrose to other sugar ratio between about 0.85:1 and about 5.13:1 all form suitable refrigerated dough compositions having $A_w$ values below about 0.75. Although not precisely understood, it is believed that a mixture of different chain length sugars is necessary to bind the free water in the dough system, in part because many sugars other than sucrose remain dissolved in water at refrigerated storage temperatures.

The most preferred dough compositions of the present invention include sugar slurries having a preferred mixture of sucrose, fructose and dextrose. These sugars are present in the dough compositions in the examples in the form of molasses, corn syrup and granulated sugar.

When using an additive other than a sugar mixture to saturate the water, it may be necessary to vary the ratio of additive to water somewhat in order to "bind" all of the available water. In some cases, it may not be necessary to saturate the solution with the agent. What is important is that the agent acts on the water in a manner which lowers the $A_w$ value of the dough.

A study was conducted to compare the $A_w$ values and sucrose/other sugar ratio of the compositions of present invention to the respective $A_w$ values and sucrose/other sugar ratio of the prior art.

The following table is a comparison of sucrose/other sugar ratios and measured $A_w$ values of several known cookie dough compositions:

TABLE

| Patent | Example | Sucrose/ Other Sugar | $A_w$ |
|---|---|---|---|
| Kenneally U.S. Pat. No. 4,738,859 | 1 (inner) | 0.57:1 | 0.665 |
| | 1 (outer) | 71.46:1 | 0.810 |
| Hong et al. U.S. Pat. No. 4,553,333 | 1 (chewy) | 0.51:1 | 0.632 |
| | 1 (crisp) | 6.28:1 | 0.593 |
| | 3 | 5.03:1 | 0.792 |
| | 4 | 31.2:1 | 0.810 |
| | 5 (chewy) | 0.39:1 | 0.621 |
| | 5 (crisp) | 24.51:1 | 0.821 |
| Brabbs et al. U.S. Pat. No. 4,503,080 | 1 (crisp) | 99.17:1 | 0.805 |
| | 1 (chewy) | 17.53:1 | 0.826 |
| | 1 (Ref.) | 99.17:1 | 0.811 |
| | 2 | 17.5:1 | 0.703 |
| | 3 | 17.5:1 | 0.412 |
| Seiden et al. U.S. Pat. No. 4,732,767 | 1 (outer) | 70.0:1 | 0.816 |
| | 1 (inner) | 0.58:1 | 0.810 |
| | 2 | 0.57:1 | 0.805 |
| Durst U.S. Pat. No. 4,582,711 | | 2.43:1 | 0.55* |

*Reported in patent

It was surprisingly discovered that by maintaining a sucrose to other sugar ratio within a range of 0.85:1 to 5.13:1 that refrigerated dough products containing color agents were highly resistant to color bleed under refrigerated storage conditions after a period of 90 days.

The dough composition of the present invention not only has excellent shelf life properties under refrigerated storage conditions, but the problems of either a reduction in dough quality or a reduction in edible particle quality or both are substantially eliminated by providing a composition which has low water activity. In particular, color bleed from color-agent containing edible particles containing dye pigments and color lakes, for example, are substantially eliminated and also eliminated are quality problems which result from edible particles absorbing moisture.

Although the present invention has been described with reference to preferred embodiments, workers skilled in the art will recognize that changes may be made in form and detail without departing from the spirit and scope of the invention.

What is claimed is:

1. A refrigerated cookie dough composition including color-agent containing edible particles consisting essentially of:

a cookie dough suitable for refrigerated storage, wherein the cookie dough composition includes an amount of sucrose and an amount of at least one sugar other than sucrose to provide a ratio of sucrose to other sugar between 0.85:1 and 5.13:1 by weight, wherein said ratio of sugar ingredients is effective to produce a dough composition having a free water activity no greater than 0.75; and a quantity of color agent-containing edible particles, the particles including at least one color-containing agent selected from the group consisting of color lakes and color pigments, combined with said cookie dough, wherein the edible particle-containing cookie dough composition is substantially free of color bleed after storage at about 45 degrees Fahrenheit for about 90 days.

2. The composition of claim 1, wherein the edible particles are selected from the group consisting of: candy coated chocolates, hard candy, confections, and color agent-containing fat-based flavor particles.

3. A method of forming a refrigerated cookie dough comprising:

combining a quantity of sugar, oil and shortening in amounts effect to form a shortening slurry;

forming a sugar slurry including:

combining substantially all of the added water to said dough composition with sucrose substantially saturating the water forming a saturated aqueous sucrose solution; and combining the saturated solution with at least one sugar other than sucrose, in a ratio of sucrose to other sugar between 0.85:1 and 5.13:1;

mixing together the shortening slurry and the sugar slurry to form a combined slurry;

providing a dry premix of dough forming ingredients; and mixing together the combined slurry and the dry premix, forming a refrigerated dough composition having a water activity no greater than 0.75 said cookie dough being suitable for combining with edible particles which contain a color agent.

4. The method of claim 3 and further comprising the step of adding flavoring after saturating the water and before combining the saturated water solution with at least one other agent.

5. The method of claim 3 wherein the dry premix comprises: flour, soda, salt, egg yolk solids, albumin and enrichment.

6. The method of claim 3, wherein the material capable of saturating the water is sucrose.

7. The method of claim 3, wherein the sugar other than sucrose is selected from the group consisting of fructose, dextrose, glycerol, maltose, glycerine, arabinose and sorbitol.

8. The method of claim 7 wherein sugar other than sucrose is present in the form of one or more members selected from the group consisting of molasses and corn syrup.

9. The method of claim 3 and further comprising the step of adding a quantity color agent-containing edible particles after the step of forming the refrigerated dough.

10. The method of claim 3 wherein the edible particles contain at least one color agent selected from the group consisting of dye pigments and color lakes and the resulting composition is substantially free of color bleed at a storage temperature of about 45 degrees Fahrenheit for about 90 days.

11. The method of claim 3 and further comprising the step of adding a quantity of color agent-containing particles, the particles including at least one color containing agent selected from the group consisting of color lakes and color pigments.

12. A method of forming a refrigerated cookie dough comprising:

combining together sugar and shortening;

saturating substantially an entire amount of added water to be added with sucrose;

combining the saturated water with at least one sugar other than sucrose, wherein a sucrose to other sugar ratio in the dough is maintained between about 0.85 and about 5.13 forming a sugar solution;

combining the sugar solution with the combined sugar and shortening to form a mixture; and adding to said mixture a dry premix of dough forming ingredient and forming a dough having an $A_w$ value no greater than 0.75; said cookie dough being suitable for combining with edible particles which contain a color agent.

13. The method of claim 12 wherein the dry premix comprises: flour, leavening, salt, sugar, egg solids and enrichment.

14. The method of claim 12 wherein the sugar solution comprises sucrose, water and at least one other sugar selected from the group consisting essentially of glycerine, fructose and dextrose.

15. The method of claim 12 and further comprising the step of adding a quantity of color agent-containing particles, the particles including at least one color containing agent selected from the group consisting of color lakes and color pigments.

* * * * *

UNITED STATES PATENT AND TRADEMARK OFFICE

CERTIFICATE OF CORRECTION

PATENT NO. : 5,171,599

DATED : December 15, 1992

INVENTOR(S) : JEAN L. WEBER, DOUGLAS A. MORRISON

It is certified that error appears in the above-identified patent and that said Letters Patent is hereby corrected as shown below:

On the Title Page, item [75]

Delete "[75] Inventor: Jean L. Weber, Minneapolis, Minn.",

Insert "[75] Inventors: Jean L. Weber, Minneapolis; Douglas A. Morrison, Minneapolis, both of Minn.

Col. 12, line 21, delete "effect", insert "effective"

Col. 12, line 36, after "0.75", insert a ";"

Col. 13, line 8, delete "to be added"

Signed and Sealed this

Ninth Day of November, 1993

Attest:

BRUCE LEHMAN

*Attesting Officer*

*Commissioner of Patents and Trademarks*